March 29, 1955  P. L. TORRE  2,705,154
SPRING SUSPENSION SYSTEM FOR MOTORCYCLES
Filed April 13, 1951
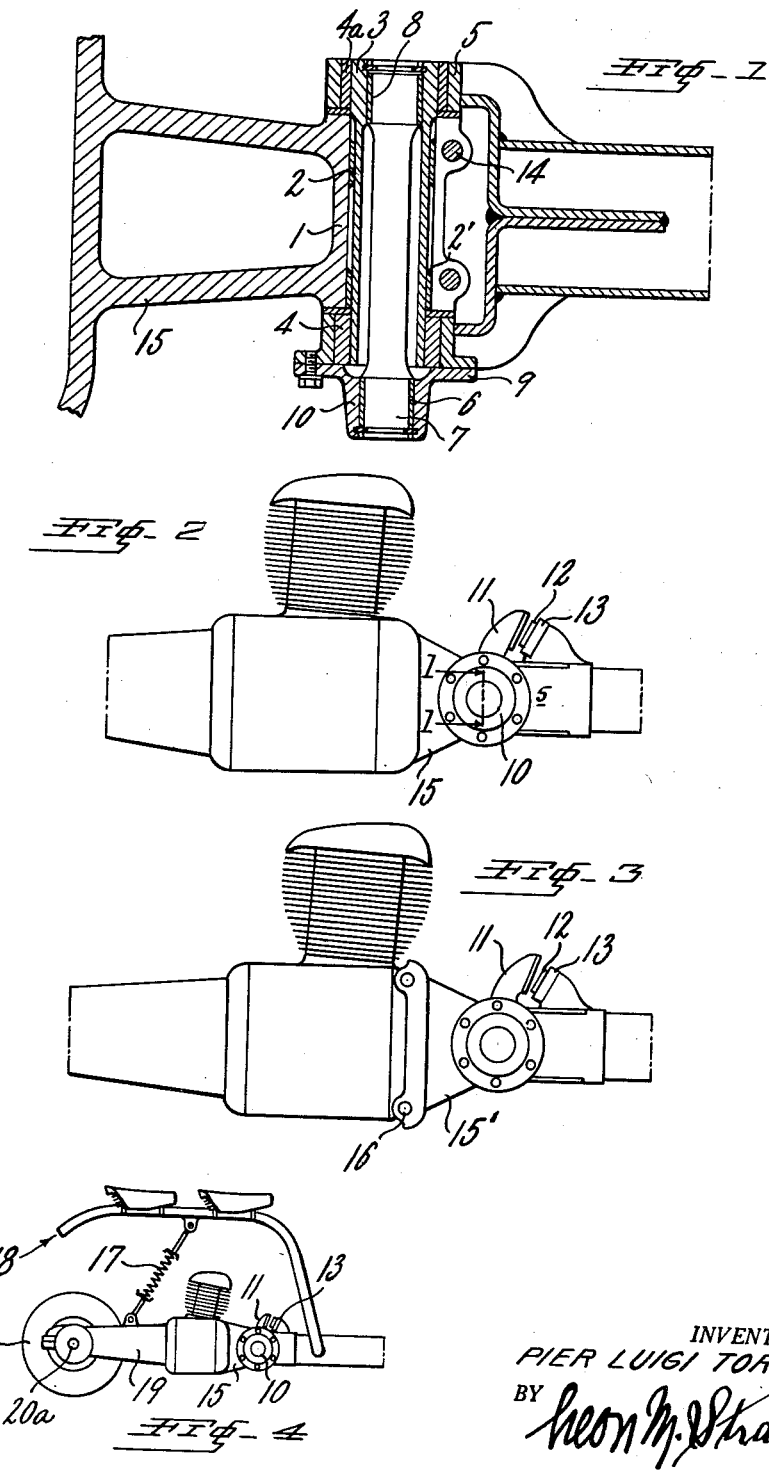
INVENTOR.
PIER LUIGI TORRE

United States Patent Office 2,705,154
Patented Mar. 29, 1955

2,705,154

SPRING SUSPENSION SYSTEM FOR MOTORCYCLES

Pier Luigi Torre, Milan, Italy

Application April 13, 1951, Serial No. 220,762

Claims priority, application Italy April 18, 1950

2 Claims. (Cl. 280—284)

The present invention relates to a spring suspension system for the rear wheel of motorcycles and like automotive vehicles.

It is known that the spring suspension for the rear wheel of a motorcycle becomes of prime importance with the increase of the vehicle speed, with respect to the comfort of the driver and/or passenger, and with respect to better road performance of the vehicle itself.

Changes in the road contour, especially at higher speeds, cause jolts of such magnitude that they can no longer be absorbed by resilient, pneumatic tires.

Furthermore the jolts cause the rear wheel, during the short time it remains out of contact with the ground, to spin at a higher speed than before its disengagement from the ground.

Such increments in rotational speed have to be subsequently braked at the instant in which the wheel comes again into contact with the ground. In this braking action, the tire is forced to slip on the ground until the rotational speed of the wheel has decreased again to what it was originally.

This of course causes a reduction of efficiency at the expense of the vehicle speed and results in unnecessary wear of the tire.

By applying to the wheel a spring suspension system, the latter disadvantage is eliminated or at least reduced inasmuch as, by suppressing the jolt, the wheel does not lose contact with the ground, and therefore is not subject to the speed variations mentioned above.

Numerous suspension systems have been designed, the more successful ones, from a technical point of view, being very complex and expensive, and therefore of very little practical use.

In acordance with the system of the present invention, the above mentioned disadvantages are avoided. More precisely, according to the present system, the assembly constituted by the engine and the wheel supporting arm, is made swingable about a point very near the engine and forwardly of the transmission shaft so that the engine mass is subject to only slight and perfectly tolerable variations of relative position.

Substantially on the pivot axis there is arranged a torsion bar, fixed at one end to the engine unit and at the other end to the motorcycle frame.

The attachment of the torsion bar to the frame and to the assembly of the engine and wheel supporting arm, may be obtained by means of a splined connection.

It is, therefore, an object of the present invention to provide means linking the swingable portion of said torsion bar to the stationary portion of the aforesaid arm so as to permit various adjustments of said swinging portion relative to the vehicle frame, in a very simple and little time consuming manner.

According to a contemplated modification of the system and within the scope of the invention, the torsion bar and springs therefore are arranged in such a way, as to bring about a progressive stiffening of the torsion bar, as the spring controlled swing of the supporting arm increases.

These and other objects and advantages of the invention will become further apparent from the following detailed description, reference being made to the accompanying drawing, showing preferred embodiment of the invention, in which:

Fig. 1 is an axial section of a preferred type of hinge joint for pivotally mounting the wheel supporting arm, the section being taken along lines 1—1 of Fig. 2.

Fig. 2 is a side view, on a smaller scale, of the engine unit with a corresponding hinge joint and supporting arm.

Fig. 3 is a view similar to Fig. 2, but somewhat modified.

Fig. 4 shows, on a still smaller scale, a preferred way of applying a supplementary spring connection between the frame and arm supporting the rear wheel of a motorcycle.

In the embodiment of Fig. 1, the engine block carrying assembly 1 is provided with a seat portion 2 having internal teeth 2' for the reception of a cylindrical element or bushing 3 extending substantially the entire length of a torsion bar 7, which rests at its ends on bearings 4, 4a carried by frame extension 5.

On one end of extension 5 there is secured by means of key or screw bolts a flange 9 carrying a splined hub 10 provided with internal teeth 6 for the reception of one end of said torsion bar 7.

The other end of said torsion bar 7 meshes with a similarly internally splined or toothed hub 8 at the corresponding inner end of said cylindrical bushing 3.

The splining on the torsion bar 7 and the external splining on bushing 3 which fits inside the corresponding teeth 2' on the engine block 1 have, respectively, a number of teeth with corresponding angular spacings which are not multiples of each other, so that by suitably varying the meshing position of the splines it is possible to obtain a wide range of relative positions of the axes of the frame and the wheel supporting arm, such as to permit adjustment of the initial relative position in very small increments.

The adjustment of the initial relative position of the wheel supporting arm with respect to the frame extension 5 may be further refined by fixing on the frame extension 5 in a suitable angular position the flange 9 carrying the splined hub 10.

An arm 11 (Fig. 2) fixed to the engine block frame 15 is arranged to abut at the end of its travel, against a resilient block 12 positioned on a suitable stationary seat 13 fixed to the frame 5, so as to limit the spring controlled swing to any desired predetermined amplitude.

To take up eventual play and looseness, seat 2 disposed on the engine block and provided with internal teeth 2' as previously described, is split longitudinally and braced by two bolts 14, so as to clamp the teeth of said seat against the splines of bushing 3.

In order to avoid the need of forming splines directly on the engine block, which is usually cast from a light weight alloy, the modification of Fig. 3 is resorted to wherein the frame portion 15', made of a material having greater strength and resistance to wear may be applied to the engine block, and secured to same by means of the transverse bolts 16.

In order to relieve the motorcycle frame from all or part of the stresses caused by the weight of the driver and passenger (load which, due to the nature of the frame design, might tend to produce bending stresses in the frame structure) it is contemplated to insert between the frame (in a position intermediate the two seats) and the swinging structure of the assembly of the engine and wheel supporting arm 19 one or more compression springs 17 suitably calibrated, as clearly illustrated in Fig. 4.

These springs may supplement the action of the torsion bar during the spring controlled swing of the wheel and arm 19.

More specifically Fig. 4 further shows a preferred manner of interposing said spring 17 between frame 18 and the wheel 20 seated on axle 20a of supporting arm 19, in order to relieve the frame from the stresses brought about by the overhung arrangement of the driver's and passenger's seats.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A wheel suspension system for automotive vehicles comprising a frame, an axle for a wheel, supporting arm"

means pivotally securing said wheel axle to said frame whereby said axle pivots about a swinging axis, an elongated torsion member having opposite ends and having its torsion axis disposed substantially coincident with said swinging axis, first securing means carried by said supporting means for fixedly engaging one end of said torsion member, second securing means carried by said frame for fixedly engaging the opposite end of said torsion member, said supporting arm means including a portion for the reception of said torsion member, said portion being provided with a plurality of teeth, said first securing means comprising a hollow cylindrical element extending substantially the entire length of said torsion member, spaced from the major part of said torsion member and interposed between said torsion member and said portion, said element being provided with teeth arranged on its external surface and with additional teeth arranged on its internal surface, said external teeth of said cylindrical element being arranged to mesh with said teeth of said portion, said torsion member being provided with circumferentially arranged tooth elements adjacent both said ends of said torsion member, the tooth elements of said one end of said torsion member being arranged to mesh with said additional teeth of said cylindrical element, said second securing means including a toothed hub meshing with said tooth elements of said opposite end of said torsion member.

2. A wheel suspension system according to claim 1, wherein said portion is split longitudinally, and fastening means interconnecting said split longitudinal portions for adjustably tensioning said portion against said cylindrical element.

References Cited in the file of this patent

UNITED STATES PATENTS

| 1,306,995 | Bradshaw | June 17, 1919 |
| 2,049,474 | Smith | Aug. 4, 1936 |
| 2,254,261 | Best | Sept. 2, 1941 |

FOREIGN PATENTS

| 233,714 | Switzerland | Nov. 16, 1944 |
| 351,913 | Italy | Aug. 25, 1937 |
| 435,426 | Italy | May 17, 1948 |
| 646,017 | Great Britain | Nov. 15, 1950 |
| 683,137 | Germany | Oct. 31, 1939 |
| 770,709 | France | July 2, 1934 |
| 890,324 | France | Nov. 2, 1943 |